April 7, 1936.  C. C. ZABRISKIE  2,036,787
METHOD OF MAKING WINDSHIELD WIPERS
Original Filed Dec. 9, 1933
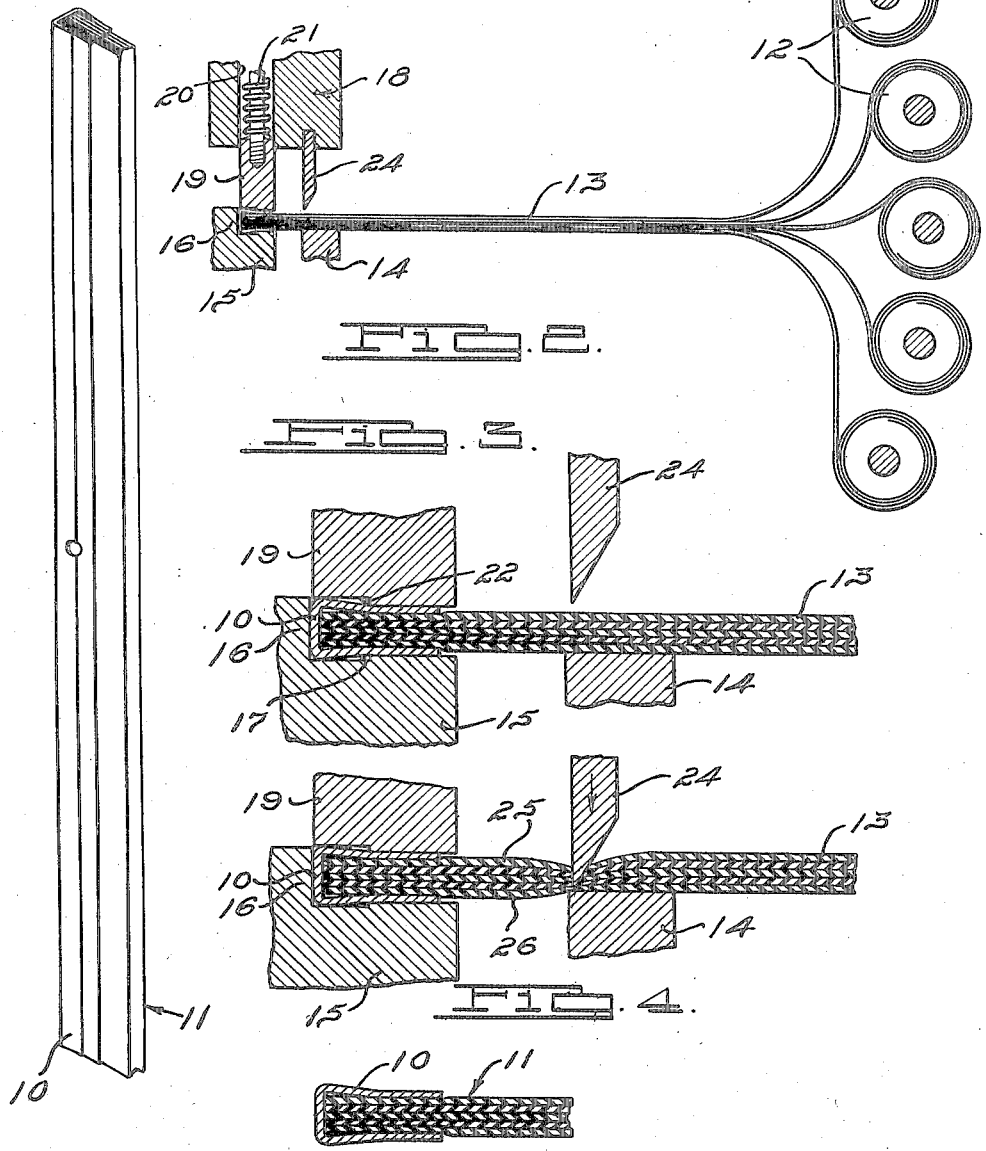
Inventor
Charles C. Zabriskie
By Harness Dickey Pierce & Ham
Attorneys Patented Apr. 7, 1936

2,036,787

UNITED STATES PATENT OFFICE 2,036,787

METHOD OF MAKING WINDSHIELD WIPERS

Charles C. Zabriskie, Detroit, Mich.

Original application December 9, 1933, Serial No. 701,597. Divided and this application February 20, 1935, Serial No. 7,336

8 Claims. (Cl. 29—84)

The invention relates to windshield wiping devices and it has particular relation to an improved device of this type and a method of making it.

The invention constitutes a division of my copending application Serial No. 701,597, filed December 9, 1933, wherein an improved wiper blade construction is disclosed. This blade comprises a plurality of superposed thin strips of rubber held at one edge in a channel and providing a generally concave wiping face at their other edge.

The object of the present invention is to provide a method of making a windshield wiper of the above mentioned character.

For a better understanding of the invention reference may be had to the drawing, wherein:

Figure 1 is an elevational view illustrating a windshield wiper constructed according to one form of the invention.

Fig. 2 illustrates a method and apparatus for constructing the wiper shown by Fig. 1.

Fig. 3 is an enlarged detail view of the arrangement shown by Fig. 2 prior to cutting through the superposed layers of rubber.

Fig. 4 illustrates the step of cutting through these layers of rubber.

Fig. 5 is a cross-sectional view on a large scale of the windshield wiper shown by Fig. 1.

Referring to Figs. 1 and 5, the wiper illustrated comprises a metal channel 10 which receives and holds a plurality of superposed, thin strips of rubber indicated at 11. It will be appreciated that the legs of this channel may be clamped against the rubber to hold the strips positively therein. In the construction illustrated, five strips of rubber are disposed in superposed relation and it will be noted that the outside strips have their free edges projecting slightly beyond the free edges of the strips adjacent thereto respectively, and that the central strip does not project quite as far as the strips on either side of it.

The free edge of the wiper, accordingly, is generally concave from the free edge of the central strip to the free edges of the outside strips and it has been found in practice that in movement of the wiper backward and forward over the windshield, a much better edge contact is obtained with the glass. It will be appreciated that in the movement of the wiper over the glass, the rubber strips outwardly of the channel flex first to one side and then to the other and if the free edges of all strips projected equally from the channel, then when the rubber is flexed during its wiping movement, a less efficient contact of the rubber with the glass would be obtained and this contact would not have the sharp edge characteristics present in the construction shown.

In constructing the wiper shown, thin sheet rubber may be provided in rolls as indicated at 12 and the rubber from the several rolls conducted in superposed relation as indicated at 13 over the spaced supports indicated at 14 and 15. The support 15 is adapted to support the channel 10 and has a vertical shoulder 16 against which the base of the channel may be aligned. Adjacent the shoulder 16, the upper surface of the support 15 has a recess 17, the purpose of which will presently be set forth. Prior to insertion of the free edges of the rubber sheets, the legs of the channel 10 may be flared in character so as to facilitate insertion of the sheets, and the channel is disposed on the support 15. For clamping the legs of the channel after the superposed sheets of rubber are directed thereinto, an upper and reciprocatory platen 18 is provided which has a bar 19 slidably mounted in a slot 20 in the platen and which is normally urged downwardly below the platen by a spring 21. This bar has a recess 22 substantially like the recess 17 and vertically aligned therewith so that surface portions of the bar and support 15 will clamp the free edge portions of the legs of channel 10 forcefully without requiring an undesirable clamping force against the base portion of the channel. During the clamping action, the base portion of the channel in alignment with the recess may be slightly bent into recess 17 in the base 15 as will readily be understood.

For cutting the strips of rubber, a knife 24 is provided and this may be rigidly connected to the platen 18 or it may be a separately reciprocatory member. The knife is so arranged or operated with respect to the bar 19, that the latter will engage the upper leg of channel 10 substantially at the same time or slightly before the knife begins to cut, from which it follows that the strips of rubber in the channel will be clamped together during the cutting operation. During the cutting operation, the bar 19 will firmly hold the channel in place and the spring 21 will permit the platen 18 and knife 24 to move downwardly to complete the cutting operation. It will be appreciated that the cutting line will be straight longitudinally of the wiper and that it will be parallel to the base of channel 10 owing to the fact that the latter is held aligned with the shoulder 16 on the support 15. This avoids having a wiper with an edge tapering toward one end. The left edge of the support 14 projects slightly beyond the cutting line so as to support the rubber under the knife while leaving it unsupported between the supports.

As best shown by Fig. 4, when the knife is pressed into the rubber, the outside strips between the channel 10 and the support 14 and knife 24 bulge outwardly in opposed directions respectively as indicated at 25 and 26, and the inner strips next to the outside strips may also bulge outwardly but to a lesser extent as compared to the outside strips while the central strip substantially may maintain itself in the same plane. Continued movement of the knife finally cuts through all of the strips and the completed wiper as shown by Fig. 5 results. Bulging outwardly of the outside strips or bending thereof causes them to be longer than the strips immediately adjacent thereto and since the latter bulge more than the central strip, they will be slightly longer than the central strip. This provides the generally concave edge previously mentioned in connection with Fig. 5. It will be observed that the superposed layers of rubber between the channel 10 and the support 14 and knife 24 are substantially unsupported so that they may bulge outwardly in the manner stated and that slight projection of the support 14 beyond the line of cutting will not interfere with bulging outwardly of the lower strips, while still supporting the rubber along the cutting line.

While five strips of rubber have been illustrated, it is of course practical to use more than five strips or less than five strips. Three strips of rubber may be used, for example, and similar results may be obtained using four strips although in this case there would not be any central strip as in the case where five strips of rubber are used.

Furthermore, the invention provides an efficient and economical method of manufacturing the wiper to obtain the results desired of a more efficient edge contact with the glass. The method is efficient and economical particularly in that sheets of rubber may be supplied in rolls and the wipers repeatedly made by clamping the free edges of the superposed sheets and severing the rubber as described and then feeding the sheets into another channel and repeating the process.

Although only one form of the invention has been illustrated and described in detail, it will be apparent to those skilled in the art that various modifications may be made without departing from the scope of the appended claims.

I claim:

1. The method of manufacturing a windshield wiper having a plurality of elongated and superposed thin strips of rubber bindingly held together at one edge and having their opposite edges free for wiping the windshield, which comprises superposing sheets of the rubber, binding said sheets along one edge and then transversely cutting by means of a pressure cutting tool through the sheets along a line substantially parallel to but spaced from the bound edge while leaving the sheets between the bound edge and the line of cutting substantially unsupported.

2. The method of manufacturing a windshield wiper having a plurality of elongated and superposed thin strips of rubber bindingly held together at one edge and having their opposite edges free for wiping the winshield, which comprises superposing sheets of the rubber, binding said sheets along one edge, supporting the sheets on one side and along a cutting line substantially parallel to but spaced from the bound edge, and then transversely cutting the sheets along said line by means of a pressure cutting knife directed against the opposite side of the superposed sheets and toward the support, while leaving the sheets between the bound edges and said knife and support substantially unsupported.

3. The method of manufacturing a windshield wiper having a plurality of elongated and superposed thin strips of rubber bindingly held together at one edge and having their opposite edges free for wiping the windshield, which comprises directing edges of the sheets into and securing them in an edge holding channel, supporting one side of the assembled sheets along a cutting line substantially parallel to but spaced from the channel, and applying a pressure cutting knife against the opposite side of the sheets and along said cutting line while leaving the sheets of rubber substantially unsupported between the channel and the knife and support.

4. The method of manufacturing a windshield wiper having a plurality of elongated and superposed thin strips of rubber bindingly held together at one edge and having their opposite edges free for wiping the windshield, which comprises superposing sheets of rubber, binding said sheets along one edge, and then transversely cutting through the sheets along a cutting line spaced from but substantially parallel to the bound edge by applying pressure to opposed sides of the superposed sheets along said line while simultaneously cutting through the sheets by means of a cutting knife while leaving the sheets adjacent the cutting line and between it and the bound edge substantially unsupported.

5. The method of manufacturing a windshield wiper having a plurality of elongated and superposed thin strips of rubber bindingly held together at one edge and having their opposite edges free for wiping the windshield, which comprises feeding sheets of rubber from rolls and into superposed relation and directing and securing their edges into a holding channel, and then cutting the superposed sheets along a cutting line substantially parallel to but spaced from the channel by applying pressure to opposed sides of the superposed sheets along said cutting line and simultaneously cutting through the sheets while leaving the latter adjacent the cutting line and between it and the bound edge substantially unsupported.

6. The method of manufacturing a windshield wiper having a plurality of elongated and superposed thin strips of rubber held at one edge in a channel, which comprises directing edges of superposed sheets of the rubber into the channel, clamping the legs of the channel to bind the edge portions of the rubber therein, and then cutting the sheets along a line spaced from the channel while holding the channel substantially parallel to the cutting line.

7. The method of manufacturing a windshield wiper having a plurality of elongated and superposed thin strips of rubber held at one edge in a channel, which comprises directing edges of superposed sheets of the rubber into the channel, clamping the legs of the channel to bind the edge portions of the rubber therein, and then at substantially the same time cutting the sheets along a line spaced from the channel while holding the channel substantially parallel to the cutting line.

8. The method of successively manufacturing windshield wiper blades wherein each blade includes an elongated channel member having elongated and superposed thin strips of rubber held at one edge therein, which comprises feeding elongated and superposed sheets of rubber of a width substantially equal to the length of the channel and directing the edges of the sheets transversely into the channel, clamping the legs of the channel to bind the edges of the rubber sheets therein, cutting the sheets along a line spaced from the channel and substantially parallel to the length thereof to provide a blade wiping edge, removing the finished blade, successively feeding newly cut edges of the sheets transversely into additional channels and repeating the clamping and cutting operations with respect to each channel.

CHARLES C. ZABRISKIE.